United States Patent [19]

Shin

[11] Patent Number: 5,473,452
[45] Date of Patent: Dec. 5, 1995

[54] LIQUID CRYSTAL DISPLAY DEVICE WITH REPAIR STRUCTURE

[75] Inventor: Seob Shin, Kyungki-do, Rep. of Korea

[73] Assignee: Goldstar Co., Ltd., Seoul, Rep. of Korea

[21] Appl. No.: 360,951

[22] Filed: Dec. 21, 1994

[51] Int. Cl.⁶ .................................................. G02F 1/1343
[52] U.S. Cl. ................................................ 359/59; 359/87
[58] Field of Search ........................... 359/54, 58, 59, 359/87, 88; 345/92, 93; 257/209, 529, 530

[56] References Cited

U.S. PATENT DOCUMENTS

| | | | |
|---|---|---|---|
| 4,807,973 | 2/1989 | Kawasaki | 359/59 |
| 4,840,459 | 6/1989 | Strong | 359/87 |
| 5,202,778 | 4/1993 | Niki | 359/87 |
| 5,303,074 | 4/1994 | Salisbury | 359/59 |
| 5,313,319 | 5/1994 | Salisbury | 359/59 |
| 5,373,379 | 12/1994 | Nakai | 359/59 |

*Primary Examiner*—William L. Sikes
*Assistant Examiner*—Tai Duong
*Attorney, Agent, or Firm*—John P. White

[57] ABSTRACT

Disclosed is a liquid crystal display device in which a repair line can be substituted for a defective bus line by spot-fusing of a laser when a defect such as an open or a short between bus lines occurs in a lower substrate on which a plurality of thin film transistors are arranged in matrix, comprising a plurality of gate bus lines are spaced from each other and arranged in row direction on the lower substrate, each of the gate bus lines being connected to a corresponding gate pad for receiving an externally applied signal; a plurality of data bus lines spaced from each other and arranged in column direction on the lower to be intersected with the gate bus lines, each of the data bus lines being connected to a corresponding data pad 3a for receiving an externally applied signal; repair portion formed in outside portion of the lower glass substrate except a portion in which the thin film transistors connected to the gate and data bus lines are formed, and connected to a repair pad for receiving an externally applied signal, the repair portion having a first crossing portion between the repair portion and each of the bus lines and a second crossing portion between a first line extended from the repair portion and a second line extended from each of the bus lines.

2 Claims, 2 Drawing Sheets

LIQUID CRYSTAL DISPLAY DEVICE WITH REPAIR STRUCTURE

BACKGROUND OF THE INVENTION

1. Field of the Invention

The present invention relates to a liquid crystal display (hereinafter, referred to as "LCD") device, and more particularly to an LCD device in which a repair line can be substituted for a defective bus line by spot-fusing of a laser when a defect such as open-circuited portion or short-circuited portion between bus lines occurs in a lower substrate on which a plurality of thin film transistors are arranged in matrix.

2. Description of the Prior Art

Generally, in fabrication sequence of LCD device, if a gate bus line or a data bus line is open-circuited or short-circuited in a thin film transistor (hereinafter, referred to as "TFT") array, such an LCD panel is distinguished as a defective panel.

To eliminate a defect caused by the open-circuited portion or short-circuited portion of a bus line, an LCD device is provided with a repair line which is formed in outside part of a plurality of TFTs on a lower glass substrate. Thus, when a defect such as short-circuited portion between gate and data bus lines or open-circuited portion of each bus line occurs, the repair line is substituted for a defective bus line, thereby allowing the TFT to be normally operated.

FIG. 1 is a plane view showing a lower glass substrate in a prior art LCD device.

In FIG. 1, the prior art LCD device has a plurality of gate bus lines 1, a plurality data bus line 3, and a repair line 5. The gate bus lines 1 are spaced from each other and arranged in row direction. Each of the gate bus lines 1 is connected to a corresponding gate pad 1a for receiving an externally applied signal and commonly connected to each gate electrode of a plurality of TFTs (not shown).

The data bus lines 3 are spaced from each other and arranged in column direction to be intersected with the gate bus lines 1. Each of the data bus lines 3 is connected to a corresponding data pad 3a for receiving an externally applied signal and commonly connected to each source electrode or each drain electrode of the TFTs.

Also, the repair line 5 is formed in outside portion of the lower glass substrate 10 except a portion in which the TFTs connected to the gate and data bus lines are formed, and is connected to a repair pad 5a for receiving an externally applied signal. The repair line 5 is intersected with the data bus lines 3 in row direction and is intersected with the gate bus lines 1 in column direction.

After fabrication of a lower panel having the above-mentioned array structure on the lower glass substrate, a defect checking process is performed. In this defect checking process, it is possible to check whether the lower panel is normally operated or not, i. e. is defective or not.

In the defect checking process, if a short in circuit occurs in a crossing portion 2 of the gate and data bus lines 1, 3 in the lower panel, a cutting process is performed to cut both ends of one of the short-circuited bus lines and then a repair process is performed to connect the gate bus line 1 or the data bus line 3 corresponding to the short-circuited crossing portion with the repair line 5 by spot-fusing of a laser. As a result, the defective panel can be normally driven.

On the other hand, in case that an open in circuit occurs in a crossing portion 2 of the gate and data bus lines, a repair process is performed to spot-fuse a crossing portion 7 between the gate bus line 1 or the data bus line 3 and the repair line 5 with an insulating layer interposed therebetween and connect the gate bus line or the data bus line with the repair line.

Repairing operation at a crossing portion 7 between the repair line 5 or a gate bus line 1 or a data bus line 3 is described in detail with reference to FIG. 2.

FIG. 2 is an enlarged view of a crossing portion 7 between a repair line and a gate bus line 1 or a data bus line 3 in a lower panel of the prior art LCD device.

As shown in FIG. 2, since in the prior art LCD device all the gate and data bus lines 1, 3 are intersected with the repair line 5, the prior art LCD device has the crossing portion 7 of the gate and data bus lines. In the crossing portion 7, the gate and data bus lines 1, 3 are electrically insulated with each other with an insulating layer (not shown) interposed therebetween.

Therefore, after fabrication of an LCD panel, an electric power is applied to bus lines and then it is checked whether an open or a short of bus lines is generated or not. If an open of a bus line, i.e. a defective bus line is detected in the checking process, the crossing portion 7 between the defective bus line and the repair line 5 is spot-fused by a laser, whereby the repair line 5 can be electrically connected with the defective bus line. When short-circuited bus lines at the crossing portion 2 are detected, after cutting both sides of one of the short-circuited bus lines, 3, the crossing portion 7 between the bus line cut thus and the repair line 5 is spot-fused by a laser to connect the repair line 5 with the bus line cut thus. With repairing of a defective bus line, TFTs of the lower panel can be normally operated.

However, since in the prior art LCD device a repairing portion is a crossing portion between the repair line 5 and a defective bus line (a gate bus line or a data bus line), there arises the problem the repair line 5 is frequently cut when the repair line is spot-fused by a laser. That is, a repairing error is frequently generated. Also, there arises another problem that a repaired portion too, has to be cut, when a repair line is cut. In case of occurrence of such a repairing error, the re-repairing process can not be performed in the construction of the prior art LCD device

SUMMARY OF THE INVENTION

It is an object of the present invention to provide, a liquid crystal display with a repair structure in which an additional crossing portion is formed in the vicinity of a crossing portion between a repair line and a gate bus line or a data bus line, so as possible to easily repair a defective bus line and re-repair it by using the additional crossing portion even if repairing of it ends in failure.

According to the aspect of the present invention, the liquid crystal display device with a repair structure, comprising a plurality of gate bus lines are spaced from each other and arranged in row direction on the lower substrate, each of the gate bus lines being connected to a corresponding gate pad for receiving an externally applied signal and commonly connected to each gate electrode of a plurality of thin film transistors; a plurality of data bus lines spaced from each other and arranged in column direction on the lower to be intersected with the gate bus lines, each of the data bus lines being connected to a corresponding data pad 3a for receiving an externally applied signal and commonly connected to each source electrode or each drain electrode of the thin film transistors; repair portion formed in outside portion of the lower glass substrate except a portion in which the thin film transistors connected to the gate and data bus lines are formed, and connected to a repair pad for receiving an externally applied signal, said repair portion having a first crossing portion between the repair portion and each of the bus lines and a second crossing portion between a first line extended from the repair portion and a second line extended from each of the bus lines.

In this LCD device, the repair portion is composed of at least two lines, and therefore a plurality of second crossing portions are formed in the lower panel. As a result, the repairing sequence can be repeated several times.

Therefore, in the LCD device, a repair line in the repair portion can be substituted for a defective bus line by spot-fusing of a laser when a defect such as an open or a short between bus lines occurs in a lower substrate on which a plurality of thin film transistors are arranged in matrix.

Also, when an open in circuit is generated in any bus-line, the defective bus line can be repaired by spot-fusing in any one of the first and second repair lines.

In addition, when a defective bus line is generated due to an open or a short of the bus lines, it can be repaired by selectively spot-fusing the first and second crossing portions, thereby allowing the LCD device to be normally operated.

BRIEF DESCRIPTION OF THE DRAWINGS

This invention may be better understood and its object will become apparent to those skilled in the art by reference to the accompanying drawings as follows:

FIG. 4 is a cross-sectional view showing the second crossing portion 7a taken along the line A–A' of FIG. 3, wherein

DESCRIPTION OF THE PREFERRED EMBODIMENT(S)

Figure 1:
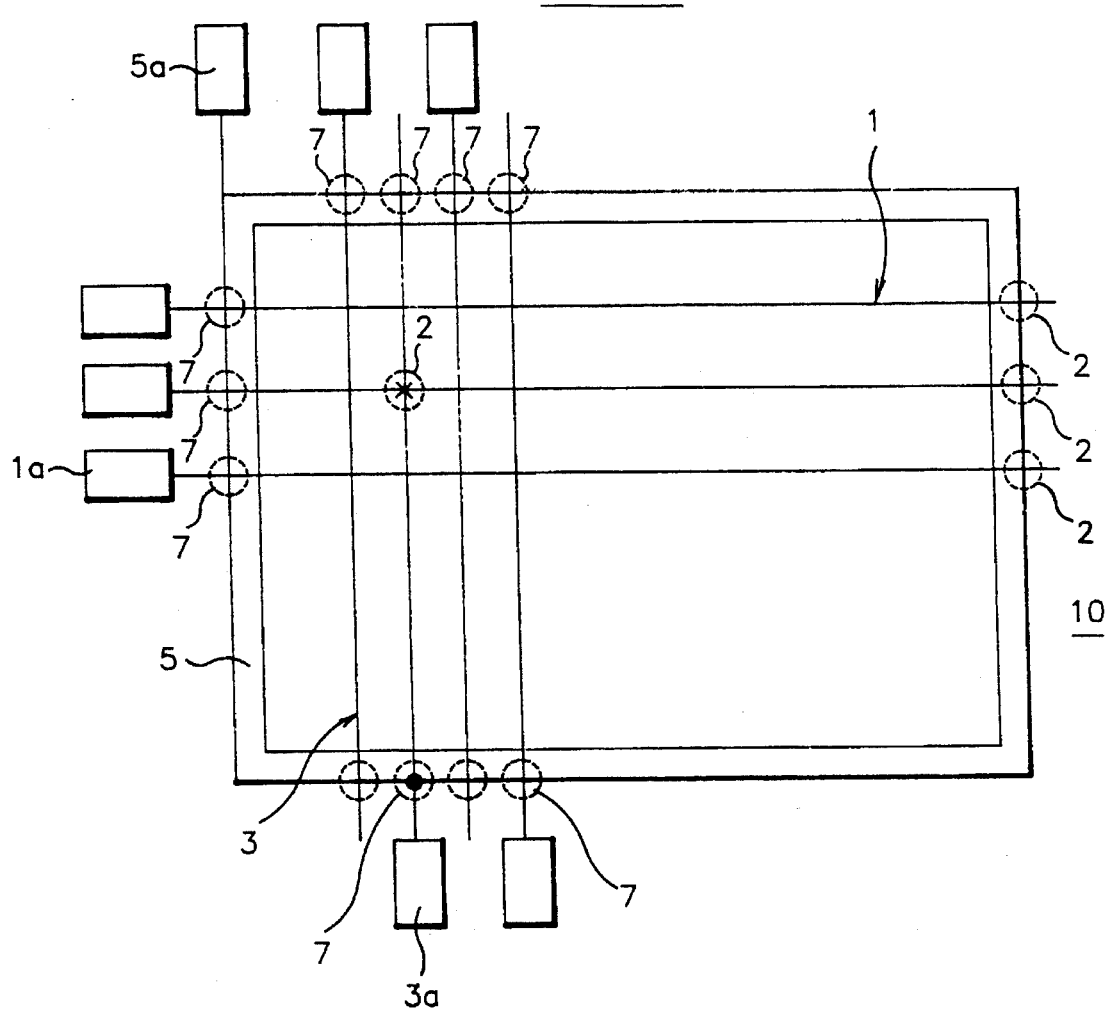
FIG. 1 is a plane view showing a lower glass substrate in a prior art LCD device.
Figure 2:
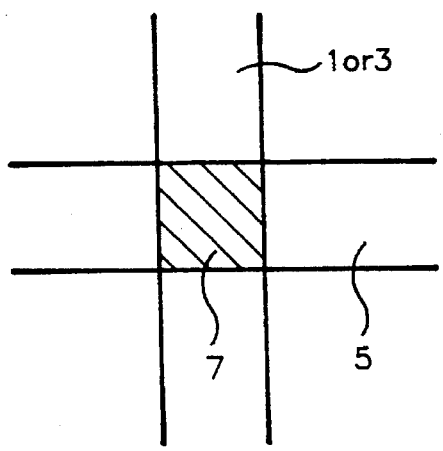
FIG. 2 is an enlarged view of a crossing portion between a repair line and a gate bus line or a data bus line in a lower panel of the prior art LCD device shown in FIG. 1.
Figure 3:
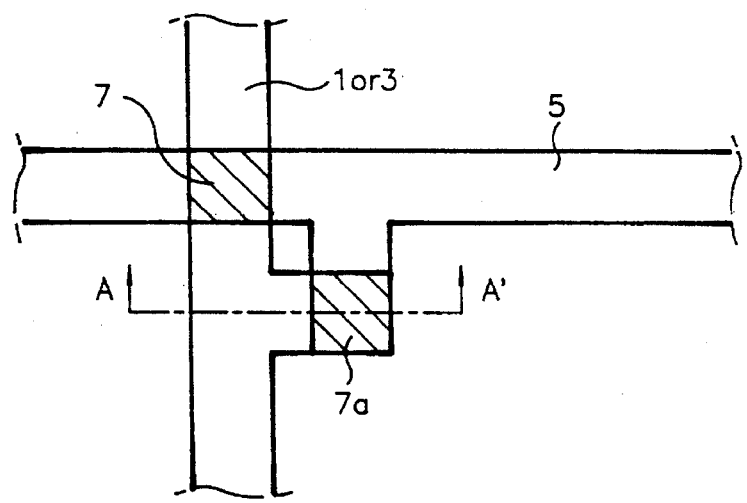
FIG. 3 is an enlarged view of a crossing portion between the gate bus line and the data bus line or the gate bus line.

The LCD device of FIG. 3 has the same construction as that of FIG. 1 except that an additional crossing portion for repairing is formed in the vicinity of a crossing portion between a repair bus line and a gate bus line or a data bus line. Component elements having similar functions to the component elements of the prior art LCD device shown in FIG. 1 are indicated by the same reference numerals, and descriptions thereof are omitted.

Referring to FIG. 3, the LCD device of the present invention has an additional crossing portion 7a in addition to a crossing portion 7 between a repair line 5 and a gate bus line 1 or a data bus line 3. The additional crossing portion 7a is a portion where a line extended from the repair line 5 and a line extended from the gate bus line 1 or the data bus line 3 are intersected with each other in the vicinity of the crossing portion 7. For brief description, the crossing portion 7 is referred to as "first crossing portion" and the additional crossing portion 7a is referred to as "second crossing portion".

In the first and second crossing portions 7, 7a of the LCD device, the repair line 5 is electrically insulated from the gate bus line 1 or the data bus line 3, and each of the first and second crossing portions 7, 7a is projected upward and is used as a repairing portion.

In FIG. 3, it is shown that the repair line 5 is composed of one line. However, the repair line 5 is limited to one line, and is composed of at least of two lines. Preferably, the repair line 5 is provided with three or four lines.

As described above, since the LCD device of the present invention has the second crossing portion 7a in addition to the first crossing portion 7, a defective bus line can be repaired by using the additional crossing portion even if repairing of the defective bus line ends in failure by using the first crossing portion, allowing the LCD device to be normally operated.

For example, in case that a short is generated between data and gate bus lines in the lower panel which is provided with a plurality of TFTs, both ends of one of the short-circuited bus lines (or defective bus lines) are cut by a laser, and then one of the short-circuited bus lines can be repaired in the first crossing portion 7 by spot-fusing of the laser. As a result, the defective bus lines can be repaired.

However, in case that the short-circuited bus lines are not repaired in the first crossing portion 7 during performing the repairing process, i.e. when a repairing error such as a short in the first crossing portion 7 occurs, both ends of the repair line 5 are cut to be electrically isolated, and then ne of the short-circuited bus lines can be repaired in the second crossing portion 7a by spot-fusing of the laser. As a result, the defective bus lines can be repaired.

Similarly, when a short in circuit is generated between data and gate bus lines, both ends of one of the short-circuited bus lines (or defective bus lines) are cut by a laser, and then one of the short-circuited bus lines can be repaired in the second crossing portion 7a by spot-fusing of the laser. However, when the short-circuited bus lines are not repaired in the second crossing portion 7a, both ends of the repair line 5 are cut to be electrically isolated, and then ne of the short-circuited bus lines can be repaired in the first crossing portion 7.

Figure 4A:
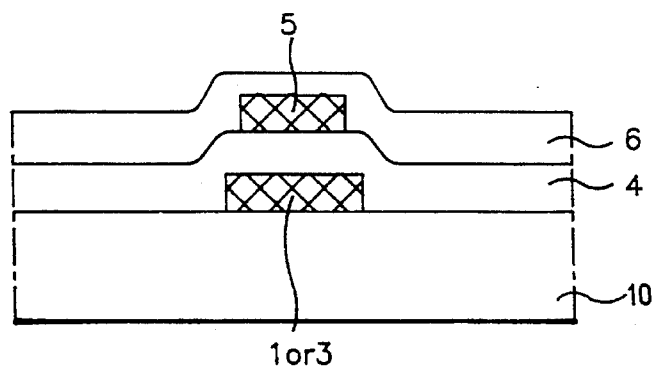
FIG. 4A shows that the gate bus line 1 or the data bus line 3 is formed under the repair line 5 and FIG. 4B shows that the gate bus line 1 or the data bus line 3 is formed above the repair line 5.
Figure 4B:
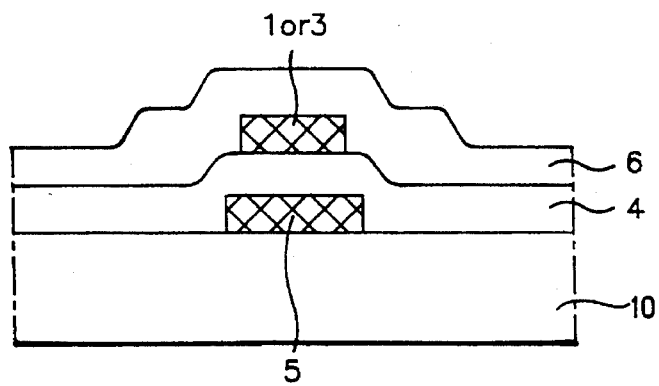

FIG. 4 is a cross-sectional view showing the second crossing portion 7a taken along the line A–A' of FIG. 3, wherein FIG. 4A shows that the gate bus line 1 or the data bus line 3 is formed under the repair line 5 and FIG. 4B shows that the gate bus line 1 or the data bus line 3 is formed above the repair line 5.

With reference to FIG. 4A, on a lower transparent substrate 10, the gate bus line 1 and the data bus line 3 are formed in matrix, and an insulating layer 4 is formed over the lower transparent substrate 10 and the bus lines 1. Also, the repair line 5 is formed on the insulating layer 4 corresponding to the bus lines, and a protective layer 6 is formed over the repair line 5 and the insulating layer 4.

As shown in FIG. 4B, on a lower transparent substrate 10, the repair line 5 is formed, and an insulating layer 4 is formed over the repair line 5 and the substrate 10. Also, the gate bus line 1 and the data bus line 3 are formed in matrix on the insulating layer 4, and a protective layer 6 is formed over the bus lines and the insulating layer 4.

As described above, since the LCD device with a repair structure has the additional crossing portion 7a (or the second crossing portion) in addition to the crossing portion 7 (or the first crossing portion) between the repair line 5 and the gate bus line 1 or the data bus line 3, a defective bus line can be repaired even if the defect bus line is not repaired by using one of the first and second crossing portions. For example, when a short is generated between data and gate bus lines, both ends of one of the short-circuited bus lines (or defective bus lines) are cut by a laser, and then one of the short-circuited bus lines can be repaired in the first or second crossing portion by spot-fusing of the laser. Then, even if the short-circuited bus lines are not repaired in one of the crossing portions, the short-circuited bus lines can be repaired by using the other of the crossing portions.

In addition, when an open in circuit is generated in any bus line, the defective bus line can be repaired by spot-fusing in any one of the first and Second repair lines. Therefore, the defective bus line can be eliminated.

As described above, in the LCD device of the present invention, even if a defective bus line is not repaired in its repairing sequence, it can be repaired by selectively spot-fusing the first and second crossing portions.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those .skilled in the art which this invention pertains.

What is claimed is:

1. A liquid crystal display device with a repair structure which is provided with a plurality of thin film transistors on a lower substrate, the device comprising:

a plurality of gate bus lines are spaced from each other and arranged in row direction on the lower substrate, each of the gate bus lines being connected to a corresponding gate pad for receiving an externally applied signal and commonly connected to each gate electrode of a plurality of thin film transistors;

a plurality of data bus lines spaced from each other and arranged in column direction on the lower to be intersected with the gate bus lines, each of the data bus lines being connected to a corresponding data pad (3a) for receiving an externally applied signal and commonly connected to each source electrode or each drain electrode of the thin film transistors;

repair portion formed in outside portion of the lower glass substrate except a portion in which the thin film transistors connected to the gate and data bus lines are formed, and connected to a repair pad for receiving an externally applied signal, said repair portion having a first crossing portion between the repair portion and each of the bus lines and a second crossing portion between a first line extended from the repair portion and a second line extended from each of the bus lines.

2. The liquid crystal display device as defined in claim 1, wherein the repair portion is composed of at least two lines.

\* \* \* \* \*